(No Model.)
G. W. WEBER.
COLLAPSIBLE HANDLE FOR VESSELS.
No. 550,428. Patented Nov. 26, 1895.
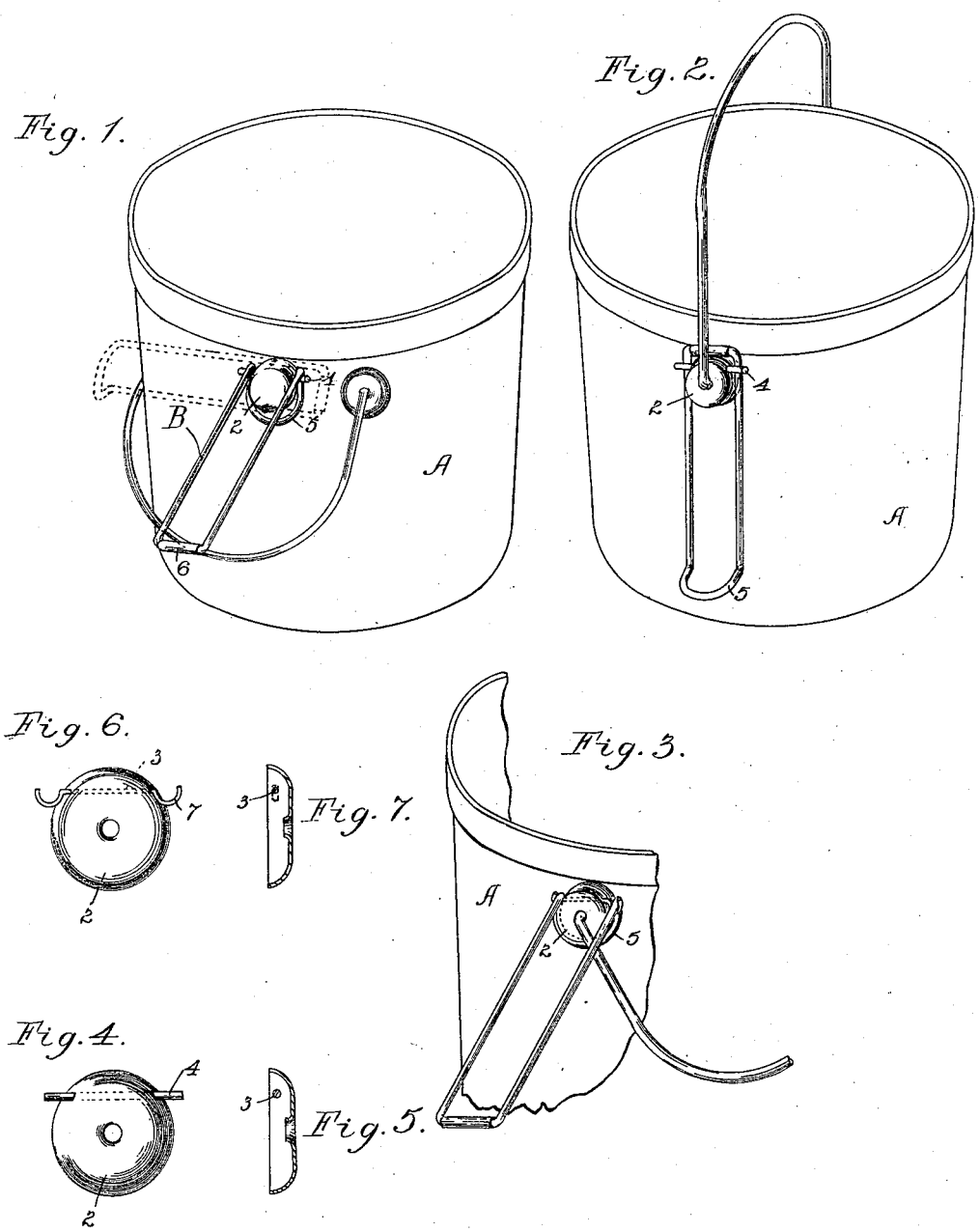
Witnesses:
F. Bradbury
H. S. Johnson
Inventor:
George W. Weber.
per: T. D. Brown
Attorney.

UNITED STATES PATENT OFFICE.

GEORGE W. WEBER, OF ST. PAUL, MINNESOTA.

COLLAPSIBLE HANDLE FOR VESSELS.

SPECIFICATION forming part of Letters Patent No. 550,428, dated November 26, 1895.

Application filed December 31, 1894. Serial No. 533,402. (No model.)

*To all whom it may concern:*

Be it known that I, GEORGE W. WEBER, of St. Paul, Ramsey county, Minnesota, have invented certain Improvements in Collapsible Handles for Vessels, of which the following is a specification.

My invention relates to improvements in pails and similar vessels; and it consists in providing an improved form of collapsible handle therefor, which may be connected to the ear carrying the bail or to a separate ear, the ear and handle being provided with interlocking means for holding the handle in adjusted positions.

My invention further consists in the construction and combination hereinafter more particularly described and claimed.

In the accompanying drawings, forming part of this specification, Figure 1 is a perspective view of a pail shown fitted with my improved collapsible handle, the handle being shown in extended position, the dotted-line position of the handle showing it in position for removal. Fig. 2 is a similar view, the handle being shown collapsed against the side of the pail. Fig. 3 is a section of a pail, illustrating the handle in use with a modified form of ear. Figs. 4 and 5 are details of one form of ear for the handle, showing a straight bar for supporting the handle; and Figs. 6 and 7 are details of a modified form of ear having hooked ends to support the handle.

In the drawings, A represents a sheet-metal pail provided with the ear 2, adapted to receive the collapsible handle B alone, or both the bail and handle, as may be desired. The handle itself is preferably formed of wire encircling the ear, its end 5 being bent at approximately a right angle with the body of the handle. When the handle is secured in place upon the ear ready for use, the bent portion 5 will bear against the pail, the body of the handle extending in a horizontal position and being supported upon the ends 4 of the bar 3. When not in use, the handle can be turned up and drawn down against the side of the pail in collapsed position, as shown in Fig. 2. Where the ear for the supplementary handle is made independent of the bail-ear, the handle can be readily removed from the ear by turning it in line with the length of the bar, as shown in Fig. 1. The ends of the handle are shown secured in the sleeve or collar 6.

In Fig. 6 is shown a modified form of ear. In this construction the ends of the bar are formed into hooks 7 to better support the handle, the handle being used with this form the same as with the other form of ear.

I claim—

1. As an improved article of manufacture, an ear for vessels fitted to receive and furnish pivotal support for the bail, and also to receive a supplementary handle and hold the same either in horizontal position or folded against the side of the vessel.

2. In combination with a vessel, the ear secured thereon, the bail fitted to, and turning in, an opening in said ear as a pivot, the folding supplementary handle, and the means upon said ear for attaching said handle to said ear and holding the same in place either in extended or folded position.

3. In combination with a vessel, a clip secured thereon, a folding handle secured to said clip, and means upon said clip for engaging said handle to secure it either in horizontal or folded position.

4. In combination with a vessel, a clip secured thereon having lateral projections, a folding handle engaging said projections and securing the same in place either in extended or folded position.

5. In combination with a vessel, a clip or knob secured thereon, the lateral projection on each side thereof, the two part wire handle arranged between said projections and the vessel, with one member on each side of said clip, and having its inner or lower end outwardly or downwardly bent at substantially a right angle with the body, and conformed to said clip so as to embrace the same when the handle is in extended or horizontal position.

6. In combination with a vessel of the class described, a clip or knob secured thereon, the slotted handle having one end bent substantially at right angles with its body and fitted to said clip and the lateral projections for engaging said handle so as to secure it against the vessel either in folded or extended position.

7. The combination with a vessel of the class described of a substantially circular clip or knob secured thereon, the lateral ears or projections upon said clip, the double wire handle having one end bent at substantially a right angle with the body and curved to fit to said clip, and arranged in engagement with said ears so as to permit its being extended and supported in horizontal position, or folded against the vessel.

In testimony whereof I affix my signature in presence of two witnesses.

GEO. W. WEBER.

Witnesses:
    T. D. MERWIN,
    H. S. JOHNSON.